United States Patent [19]

Sarh et al.

[11] Patent Number: 4,512,837

[45] Date of Patent: Apr. 23, 1985

[54] APPARATUS FOR MAKING A SURFACE TYPE STRUCTURAL COMPONENT, ESPECIALLY FOR AIRCRAFT

[75] Inventors: Branko Sarh, Hamburg; Hartmut Pasenau, Bremen, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 544,112

[22] Filed: Oct. 20, 1983

Related U.S. Application Data

[63] Continuation-in-part of Ser. No. 540,705, Oct. 11, 1983, which is a continuation of Ser. No. 228,680, Jan. 26, 1981, abandoned.

[30] Foreign Application Priority Data

Jan. 31, 1980 [DE]  Fed. Rep. of Germany ....... 3003552

[51] Int. Cl.³ .............................................. B31C 13/00
[52] U.S. Cl. .................................... 156/189; 156/191; 156/194; 156/245; 156/304.2; 156/350; 156/381; 156/389; 156/443; 156/446; 156/458; 156/459; 156/471; 156/500
[58] Field of Search ............... 156/184, 189, 191, 196, 156/213, 227, 242, 245, 304.1, 304.2, 350, 381, 389, 443, 446, 458, 459, 469, 470, 500; 244/119, 123, 131, 132, 133

[56] References Cited

U.S. PATENT DOCUMENTS

| | | | |
|---|---|---|---|
| 3,216,457 | 11/1965 | Zavasnik | 156/304.2 |
| 3,795,559 | 3/1974 | Horn et al. | 156/304.2 |
| 3,943,030 | 3/1976 | Olsen et al. | 156/446 |
| 4,079,903 | 3/1978 | Ashton et al. | 244/123 |
| 4,292,108 | 9/1981 | Weiss et al. | 156/271 |

FOREIGN PATENT DOCUMENTS 2642523  3/1978  Fed. Rep. of Germany .

Primary Examiner—Caleb Weston
Attorney, Agent, or Firm—W. G. Fasse; D. H. Kane, Jr.

[57] ABSTRACT

A surface type structural component such as a wing for an aircraft is curved in space and is manufactured from a plurality of fiber wound box frames forming longitudinal and cross ribs made of fiber reinforced resin impregnated material. These box frames are formed as modular units by winding the fiber compound material onto mold bodies and assembling the mold bodies for bonding the box frames together to form a reinforcing grid structure while the box frames are still on the mold bodies. A laminated sheathing is bonded to the grid structure. Methods and apparatus including an automated assembly plant are disclosed for manufacturing the surface type structural component. The manufacturing plant includes automated handling equipment for winding the box frames onto the mold bodies, assembling the mold bodies and box frames into grid structures, forming and applying a laminate sheathing, curing and hardening the grid structure and laminate sheathing combination simultaneously under heat and pressure produced by the expanding mold bodies and removing the mold bodies from the box frames. A mold body comprising a plurality of releasably interconnecting members includes a center member with an elongate core of heat expandable material for producing the pressure for the bonding when the resin cures. The mold bodies are so constructed that they disassemble easily for removal from the box frames and subsequent reuse.

11 Claims, 16 Drawing Figures

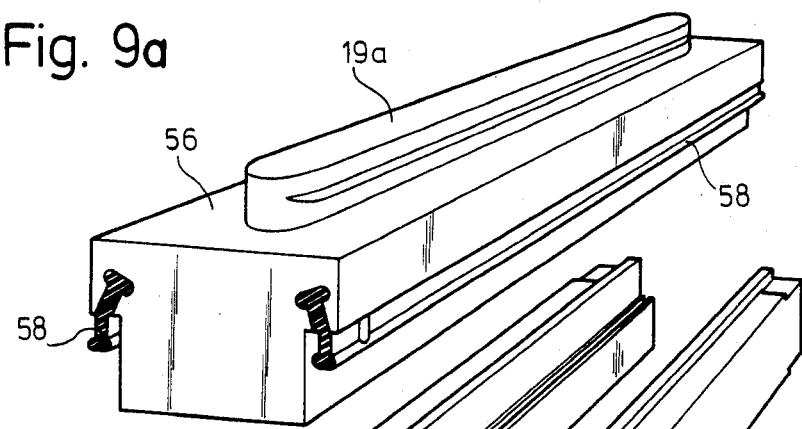
Fig. 9a
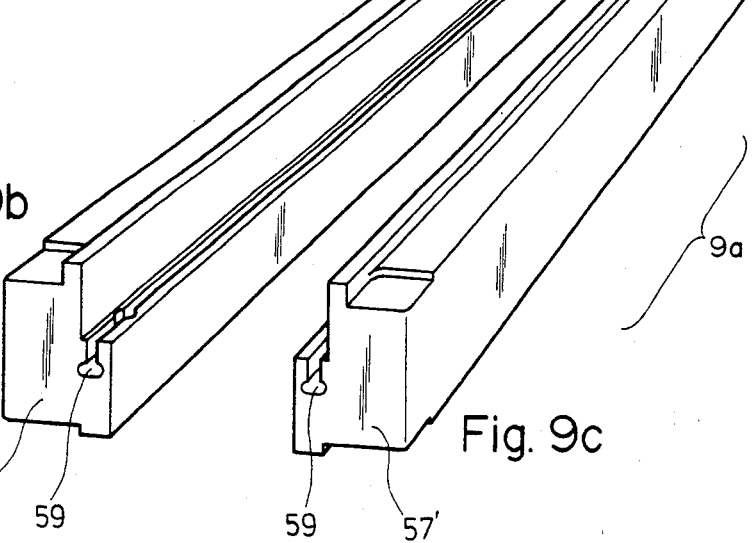
Fig. 9b
Fig. 9c
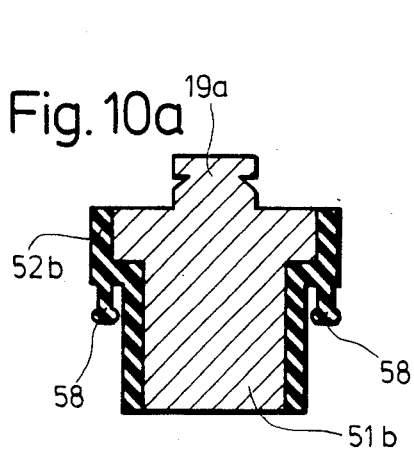
Fig. 10a
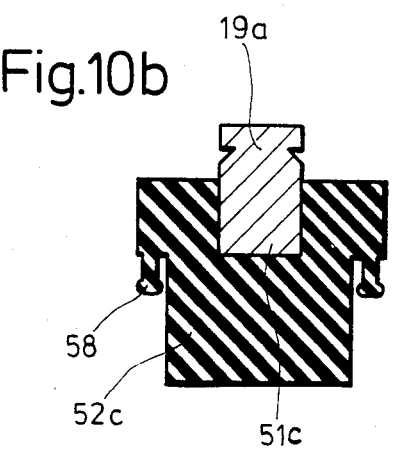
Fig. 10b

APPARATUS FOR MAKING A SURFACE TYPE STRUCTURAL COMPONENT, ESPECIALLY FOR AIRCRAFT

CROSS-REFERENCE TO RELATED APPLICATION

The present application is a continuation-in-part of my copending U.S. Ser. No. 540,705, filed Oct. 11, 1983 which in turn is a continuation of U.S. Ser. No. 228,680, filed on Jan. 26, 1981, now abandoned.

BACKGROUND OF THE INVENTION

The invention relates to apparatus for manufacturing a surface type structural component especially wing components for aircraft. Such components comprise longitudinal and cross ribs made of fiber reinforced synthetic material and covered with an outer planking or sheathing.

German Patent Publication (DE-OS) No. 2,642,523 discloses the formation of the longitudinal and cross ribs of an aircraft structural component as channel type depressions in two belly type molds which are approximately mirror-symmetrical relative to each other. These belly type or positive molds cooperate with a respective negative mold.

Synthetic resin and the respective fiber laminate is inserted into the depression of the belly molds and laminated onto the negative molds. These steps are performed independently of each other. After the respective belly mold and the negative mold have been assembled, they are interconnected in an adhesive manner and hardened or cured. Thereafter the belly molds are removed. Thus, two shell components are formed and further structural elements must still be inserted between the shell components prior to the assembly for interconnecting of the two shell components. The further structural elements may, for example, comprise the supporting wing spar and the connecting hardware. A substantial disadvantage of this type of construction is seen in that the production of the components involves high labor costs. Additionally, new belly molds for the ribs are required for each new model. Since the spar is directly connected to the shell skin or sheathing in an adhesive manner, the ribs are not arranged in a through extending manner. Thus, the fiber strands of the ribs are interrupted and it is not possible to effectively introduce the forces into the spars.

OBJECTS OF THE INVENTION

In view of the above it is the aim of the invention to achieve the following objects singly or in combination:

to produce a surface type structural component as described above which has a high strength relative to its weight and with simple structural features well suited for mass production purposes;

to construct a surface type structural component capable of effectively or efficiently taking up the occurring forces and transmitting these forces into the structure to which these surface type components are secured;

to provide a surface type structural component of simple modular elements assembled into a reinforcing grid structure and cured and hardened under heat and pressure;

to provide an apparatus for producing modular molded elements of high strength and for assembling the modular elements into a reinforcing grid structure of any desired shape or configuration;

to provide new and improved mold bodies of releasably interconnected members suitable for producing modular molded box frames for cooperation with reinforcing grid structures;

to provide new and improved mold bodies and work pieces of releasably interconnecting members which may be readily released and removed from molded box frames after curing and hardening of grid structures assembled from said box frames;

to provide such mold bodies which expand upon heating for curing, hardening and bonding modular frames and assembled grid structures under heat and pressure; and to provide new and improved methods for forming modular molded box frames and new and improved methods for manufacturing reinforcing grid structures and surface type structural components from said modular frames and cells.

SUMMARY OF THE INVENTION

In order to achieve the foregoing objects the present invention provides a surface type structural component particularly applicable for aircraft comprising a reinforcing grid structure of longitudinal and cross ribs made of fiber reinforced compound synthetic material such as a fiber material impregnated by synthetic resin. According to the invention the grid structure is assembled from a plurality of molded box frames, each frame in turn is formed by two longitudinal members and two cross members. The box frames are assembled and bonded together to form the reinforcing grid structure. The longitudinal members and the lateral members in combination define the longitudinal ribs and cross ribs of the grid structure. A laminated planking is bonded to the grid structure.

A method and apparatus for forming the surface type structural components are also disclosed. Apparatus is provided for holding and rotating successive mold bodies, feeding and applying tape of impregnated fiber material to the periphery of each rotating mold body to form box frames wound onto the mold bodies and pressing the multi-layers of tape against the mold bodies. The mold bodies with the box frames wound thereon are assembled along longitudinal carriers to form a plurality of parallel longitudinal grid elements. The longitudinal carriers are in turn mounted in parallel on cross beams or cross carriers in sliding relationship and pressed together to form the two-dimensional grid structure by curing the resin material. A laminate planking is applied to the grid structure followed by curing and hardening of the two-dimensional grid structure and laminated planking combination under heat and pressure.

According to the preferred embodiment each mold body comprises a plurality of releasably interconnectable members including a center member with an elongate core of metal and at least a layer of heat expandable rubber or elastic material. A feature and advantage of the multi-member interconnected mold body is that the mold body expands inside a box frame upon heating providing pressure for a secure bonding of the impregnated fiber material during curing and hardening. Furthermore, due to said elastic material the mold bodies may be easily released and removed from the grid structure after curing and hardening. The mold bodies are removed in the direction away from the planking.

The structural components of the invention are suitable for manufacture in a completely automated manufacturing plant. According to this aspect of the invention the apparatus for forming box frames on the mold bodies comprises means for assembling the mold bodies to form longitudinal grid elements, for assembling the grid elements into the shell type grid structure, for applying laminated planking to the grid structure, for curing and hardening the combination, and for removing the mold body from the cured grid structure. These means are placed in an operative relationship with automated handling equipment or "robots" all under a central numerical control.

Thus, the features of the invention result in a manufacturing sequence or steps which may be automated to a substantial extent. The assembly of the entire structural component takes place by using predominantly elements which have not yet been cured and which are treated in a single or common high temperature pressing operation. This teaching opens up the possibility of producing relatively complex, fiber reinforced components of synthetic materials in an advantageous manner by mass production steps, for example, in the manufacturing of aircraft wings or the like.

A feature and advantage of the invention is seen in that the modular box frame elements assembled into the grid structure and the laminate planking are bonded together in a single curing and hardening step to form a high strength unitary integrated structure of fiber reinforced polymerized material.

Due to using standardized dimensions for the reinforcing grid of fiber materials, it is possible to use the respective mold bodies for making structural components repeatedly and even for different types of models of aircraft or the like.

BRIEF FIGURE DESCRIPTION

In order that the invention may be clearly understood, it will now be described, by way of example, with reference to the accompanying drawings, wherein.

Figure 11:
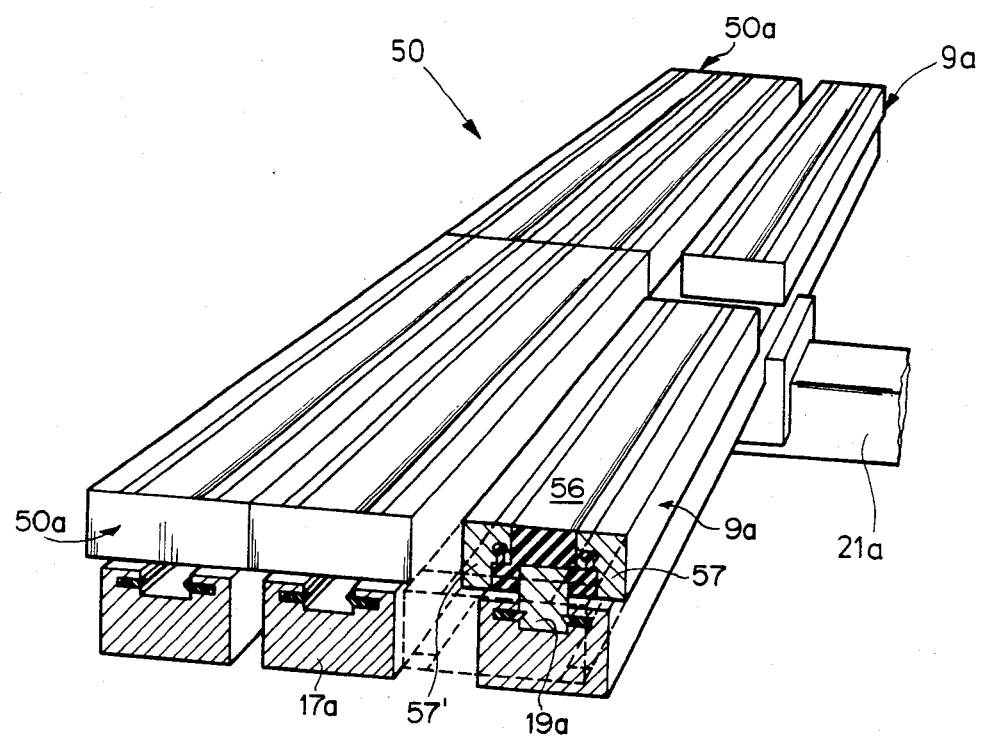
Figure 12:
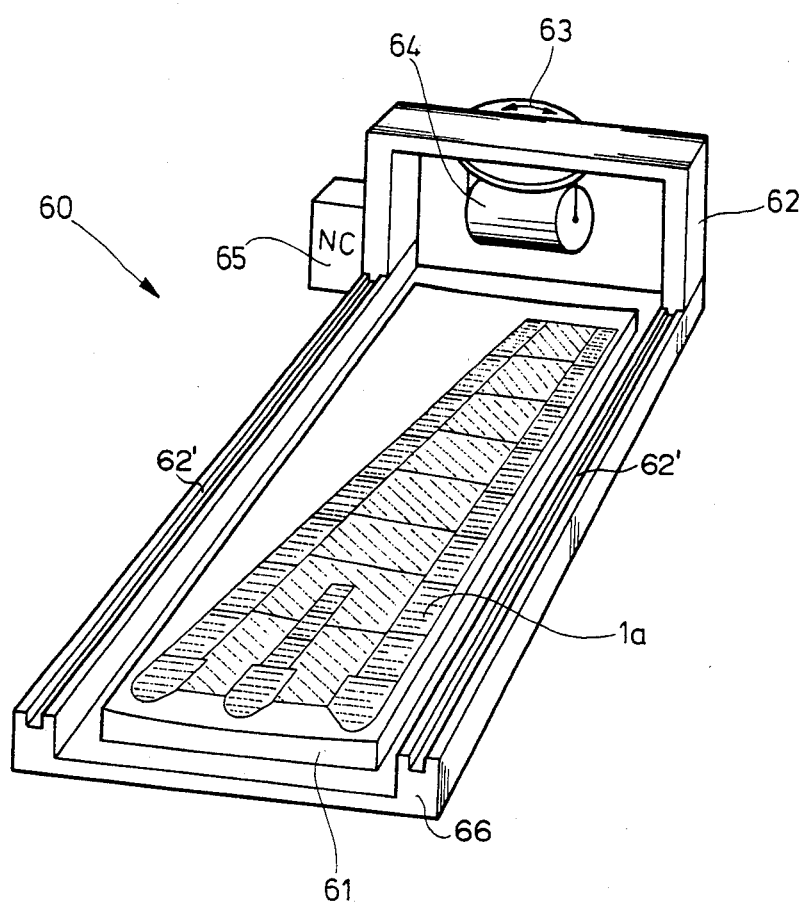
Figure 13:
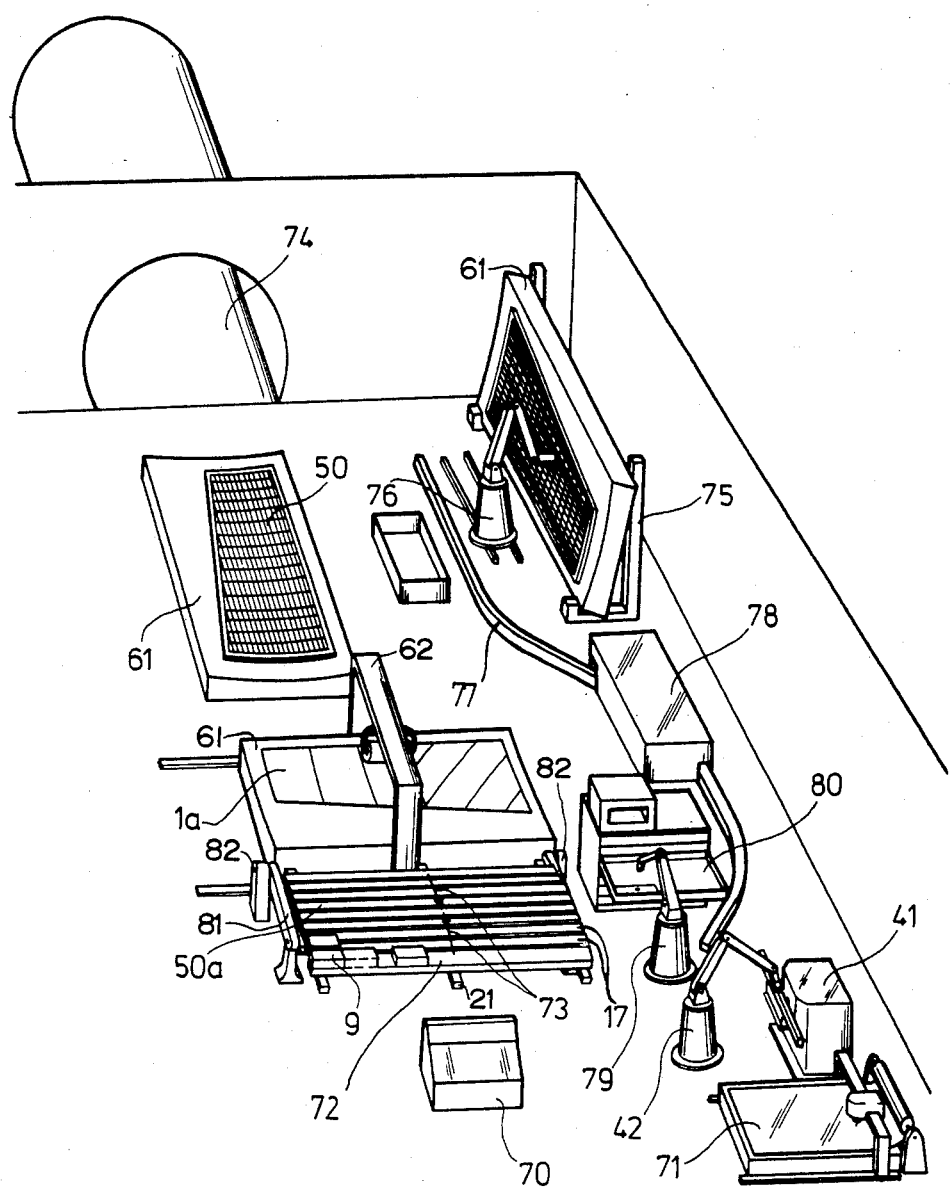

FIGS. 9a, 9b, and 9c illustrate a perspective view of a mold body having several elements;

FIGS. 10a, and 10b show sectional views through modifications of mold bodies having a somewhat different shape;

FIG. 11 illustrates the assembly of mold bodies such as shown in FIG. 9 to form a grid structure;

FIG. 12 shows a perspective view of an apparatus for applying or laying laminated, fiber reinforcing layers to or on a gluing device; and FIG. 13 shows a somewhat simplified, perspective overall view for a fully automatic production assembly line for manufacturing of surface type structural components.

DETAILED DESCRIPTION OF PREFERRED EXAMPLE EMBODIMENTS AND OF THE BEST MODE OF THE INVENTION

Figure 1:
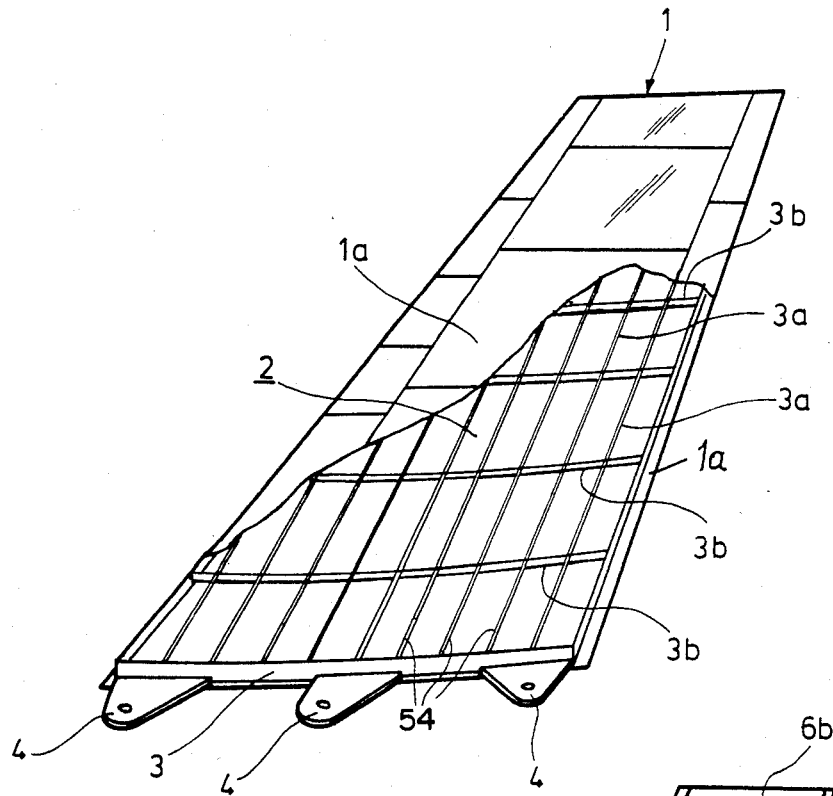
FIG. 1 is a perspective view of a structural component illustrating as an example a rudder assembly shell.

FIG. 1 shows a perspective view of a surface type structural component 1 according to the invention including a stiffening or reinforcing grid 2 made of fiber reinforced synthetic material covered by a laminate planking 1a. The component is, for example, the right-hand shell of a vertical fin forming part of a rudder assembly of an aircraft.

Figure 2:
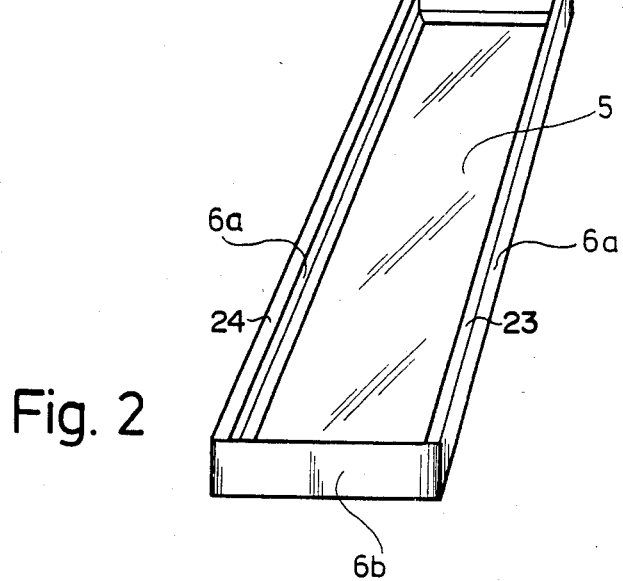
FIG. 2 illustrates a perspective view of a box frame used in FIG. 1.

The laminate planking 1a made of preimpregnated fiber material later forms the outer skin of the structural component. The reinforcing grid 2 is arranged on the inside of the laminate planking 1a. This grid 2 comprises longitudinal ribs 3a and cross ribs 3b the latter being curved as shown in FIG. 1. The structural component further comprises hardware elements 4 for securing the fin to the aircraft body. The reinforcing grid 2 is assembled to comprise a plurality of box frames 5. FIG. 2 shows a respective box frame 5. This frame 5 comprises two longitudinal wall members 6a and two end or cross wall members 6b which form in the grid 2 the respective longitudinal ribs 3a and the curved cross ribs 3b. The width of members 6a and 6b extends perpendicularly to the main plane defined by the grid 2. Further, the cross wall members 6b are sufficiently short relative to the longitudinal wall members 6a as shown in FIG. 2 so that the end-to-end relationship of the cross wall members 6b permits the cross ribs 3b to be curved as shown in FIG. 1.

Figure 3:
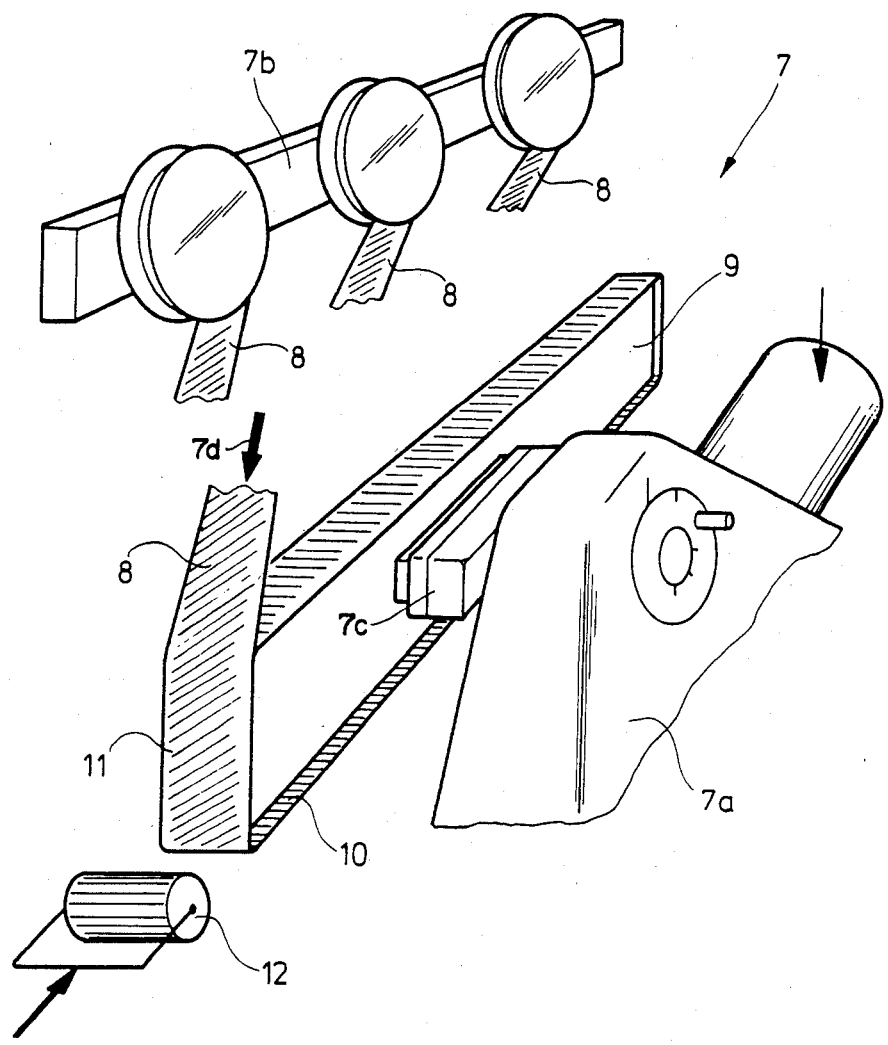
FIG. 3 illustrates an apparatus for applying fiber reinforcing tapes to a mold body, whereby such apparatus is referred to as a bandaging apparatus.

The box frames 5 are individually manufactured for example as shown in FIG. 3 using a bandage applying mechanism 7 comprising primarily a device 7a for holding and driving a work piece and a coil magazine 7b. A work piece such as a mold body 9 is secured to the drive and holding mechanism 7a by means of a holding device 7c. A tape 8 forming a tape layer or several such tapes 8 forming several tape layers is or are pulled off the coil magazine 7b and wound onto the mold body 9 as the latter is rotated in the direction shown by the arrow 7d shown in FIG. 3. The tapes 8 are made of fiber material preimpregnated by a synthetic resin. The tapes 8 are broader than the width of the mold body 9 so that margins 10 and 11 are formed. A presser roller 12 is used to laterally press the tapes 8 against the sides of the mold body 9.

Figure 4:
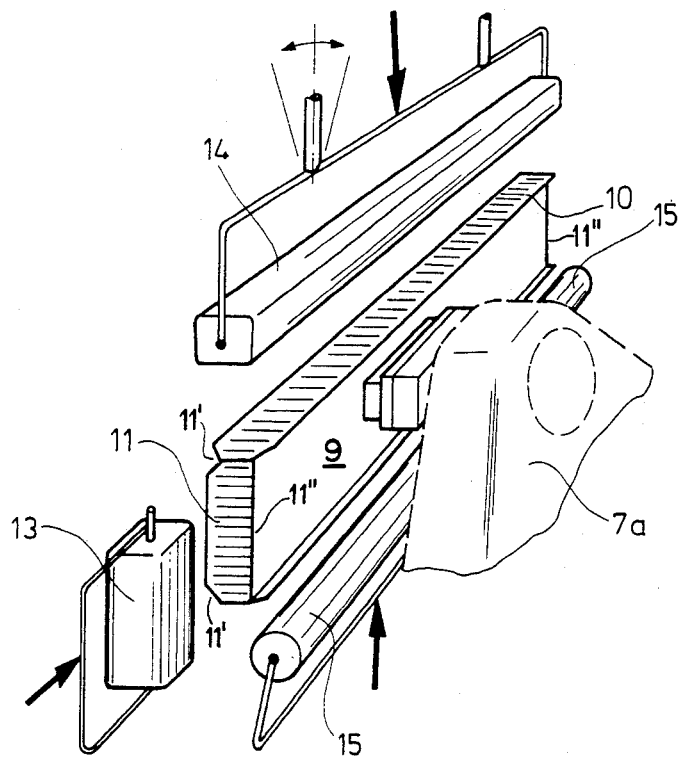
FIG. 4 illustrates a modification of the bandaging apparatus of FIG. 3 equipped with hold-down or press-on devices.

FIG. 4 shows the holding and driving mechanism 7a still holding the mold body 9 according to FIG. 3. The long margins 10 and the short margins 11 have been prepared for a lateral folding operation by cutting gussets 11' into the margins at the corners of the mold body 9. FIG. 4 further shows holding-down or pressing-down tool members 13, 14, and 15 for folding over and pressing-down the margins 10 and 11. However, the short margins 11 are cut off on one side at both ends of the mold body 9 as shown at 11" in FIG. 4.

Figure 5:
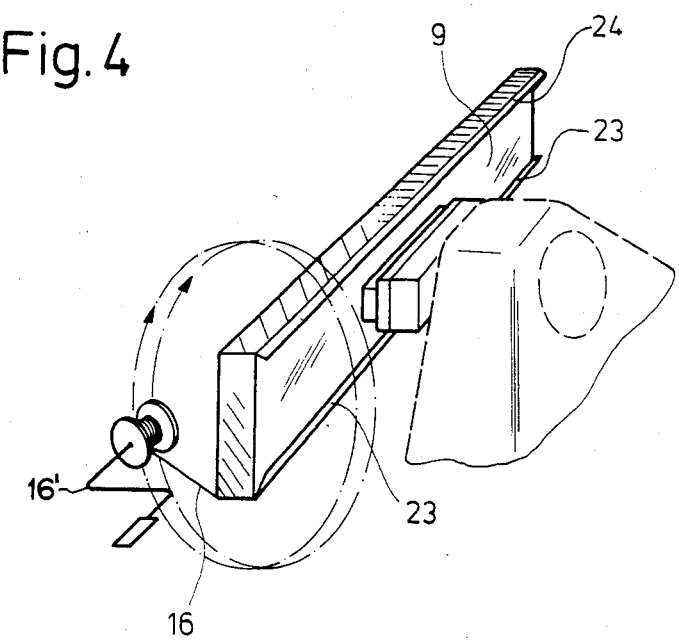
FIG. 5 illustrates a clamping drive unit of the apparatus of FIG. 3 shown when securing the flanges.

FIG. 5 shows the mold body 9 according to FIG. 4 after the long margins 10 have bean folded over and pressed against the mold body 9 so that the long flanges 23 and 24 are formed. In order to avoid the bending open of the long flanges 23 and 24 back into a position where they still form margins 10 and 11, a fiber thread 16 may be wound around the mold body to hold down the long flanges 23, 24 also shown in FIG. 2. This may be accomplished by a conventional tool 16'.

Figure 6:
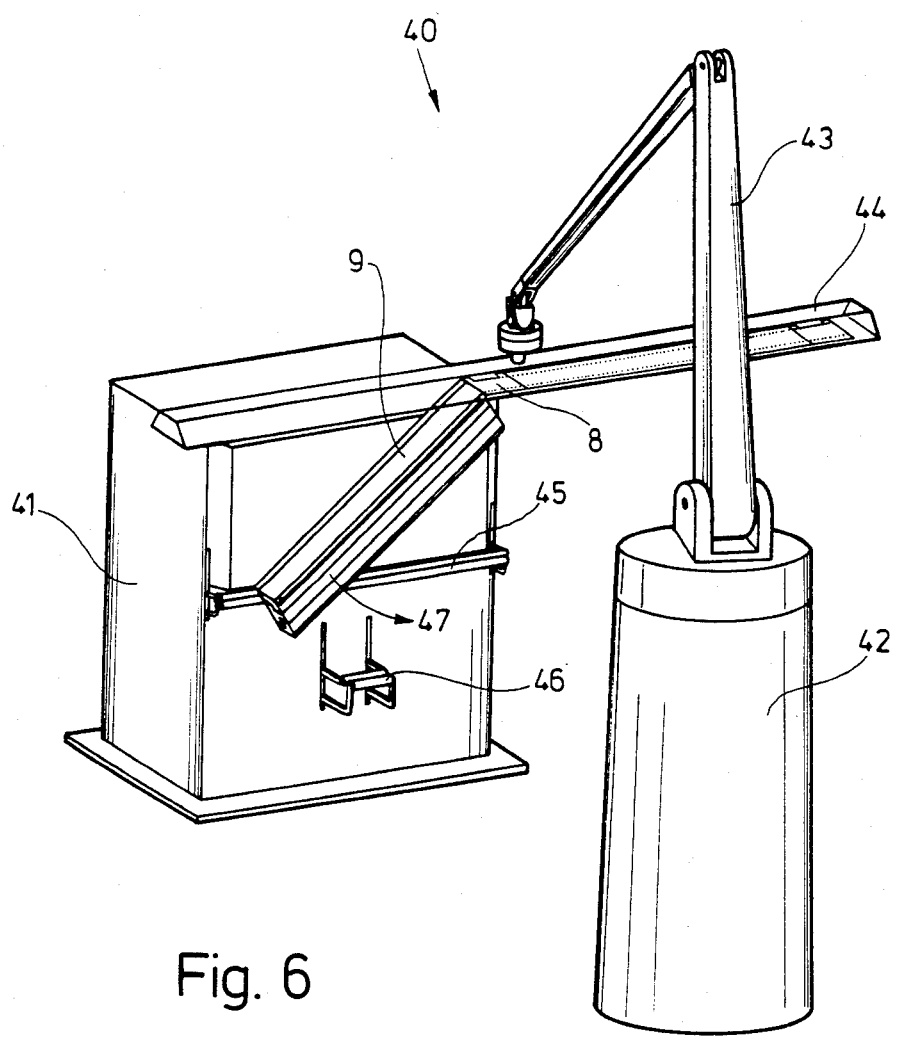
FIG. 6 illustrates another embodiment of a bandaging apparatus.

FIG. 6 shows another embodiment of a mechanism 40 for bandaging a mold body. The mechanism 40 comprises mainly a holding and driving as well as pressing down unit 41 cooperating with a respective robot or automatic handler 42. The robot 42 comprises a vacuum rail 44 secured to a pivot arm 43. The unit 41 comprises a holding or securing member such as a chucking device for holding the mold body 9 and for simultaneously rotating the mold body 9 in the direction of the arrow 47. Additionally, the unit 41 comprises pairs 45 and 46 of rollers. The rollers 45 and 46 press the tape 8 against the mold body and fold over the margins 10 and 11. One set of rollers is effective on each facing side of the mold body 9. The automatic handling device or robot 42 picks up a length of tape 8 cut to the proper length for holding the tape by means of the vacuum rail 44. The tape length or pieces are maintained in a stack not shown. As the rail 44 is held against the mold body 9, the tape length is wound onto the mold body 9 when the latter rotates.

Figure 7:
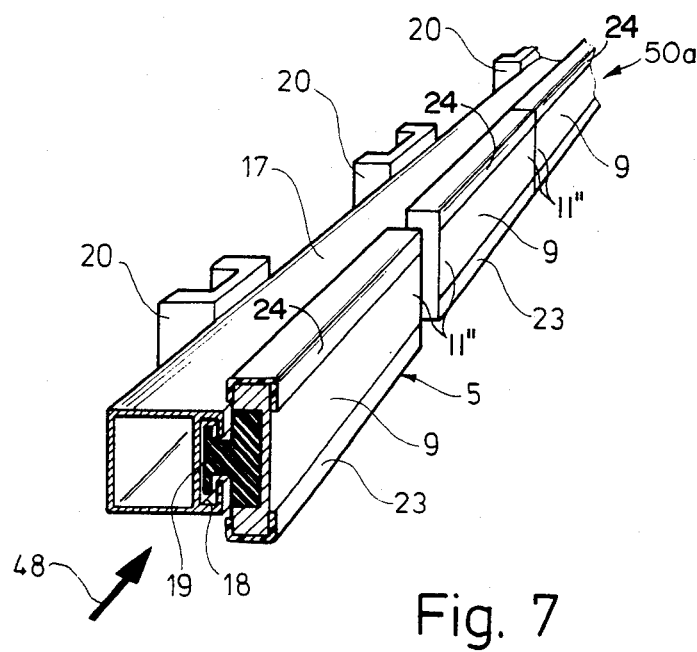
FIG. 7 illustrates a perspective view of a longitudinal support beam carrying a plurality of mold bodies.

FIG. 7 illustrates a plurality of mold bodies 9 with box frames 5 wound on these mold bodies. The mold bodies 9 with the respective box frames 5 are arranged in a row on a longitudinal carrier beam 17 provided with a guide rail 18, whereby guide elements 19 arranged on the mold body 9 reach into the guide rail 18. The longitudinal carrier beams 17 are provided with spaced cross guides 20. Prior to the next manufacturing step the mold bodies 9 and hence the box frames 5 are pressed solidly against one another in the direction of the arrow 48.

Figure 8:
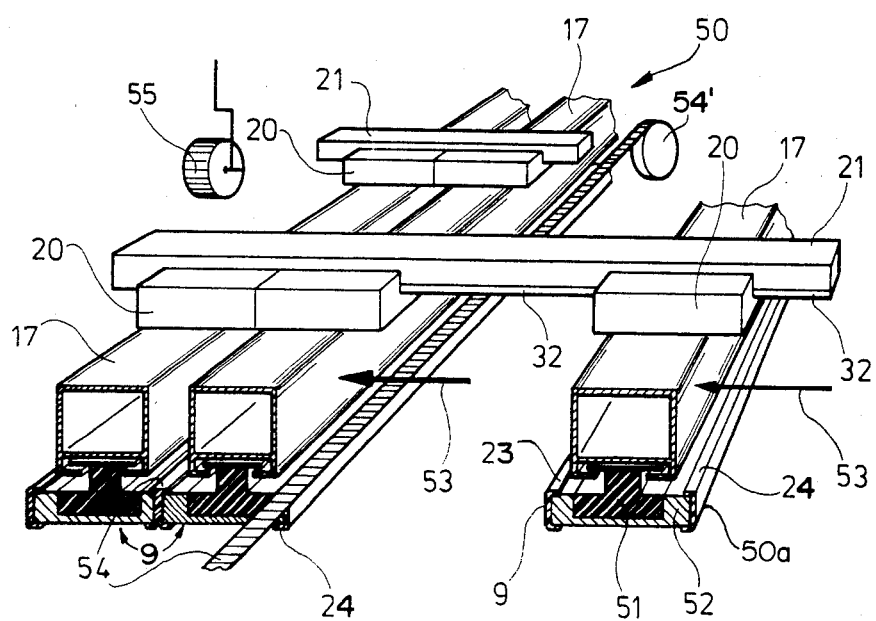
FIG. 8 illustrates perspectively the assembly of a grid structure.

FIG. 8 shows the assembly of the longitudinal carrier beams 17 on cross beams 21 by means of the cross guides 20. The individual mold bodies 9 are assembled into longitudinal grid elements 50a on the longitudinal carrier beams 17. The longitudinal grid elements 50a mounted on beams 17 are in turn assembled into the three-dimensional grid structure 50 on cross beams 21. The mold bodies 9 proper are formed of metal elements 52 and of elastic materials 51 such as an expansion rubber which expands in response to heat. The individual longitudinal carrier beams 17 are pressed firmly together in the direction of the arrow 53. Thereafter the long flanges 23 and 24 are reinforced by applying thereto a tape 54 and rolling the tape 54 down by means of a roller 55. The tape 54 is pulled off a supply roller 54' and bonded to the long flanges 23 and 24 by the subsequent curing of the synthetic resin material. As shown in FIG. 8 the tape 54 already applied to the long flanges 23, 24 of the adjacent mold bodies 9 in the lower left-hand portion of FIG. 8 covers both long flanges 23, 24.

FIGS. 9 and 10a and 10b show further examples of mold bodies 9a. The mold body 9a of FIG. 9 comprises three components. A center member 56 is shown in FIG. 9a. A left-hand member 57 is shown in FIG. 9b. A right-hand member 57' is shown in FIG. 9c. The side or lateral members 57, 57' are of mirror-symmetrical shape relative to each other. The members 56,57, 57' are made of metal in the embodiment of FIG. 9. The interconnection of the elements is accomplished by rubber strips 58 having a predetermined sectional shape fitting into respectively formed grooves 59 in the side members 57, 57'. Thus, the assembled mold bodies shown in FIG. 11 form integrated elements of the apparatus. For adapting the shape of the mold body to the characteristics of the material of the expandable rubber modifications of the center member 56 are shown in FIGS. 10a and 10b.

In the embodiment of FIG. 10a the center member of the mold body is formed with a metal core 51b and a layer of expansion rubber or similar elastic material 52b over each side of the core is covering the entire side. The layers 52b include rubber strips 58 for interfitting with the respective grooves 59 of the side members of the mold body. A guide element 19a for reaching into a guide rail is an integral part of the metal core 51b.

In the embodiment of FIG. 10b the major portion 52c of the center member of the mold body is made of expandable rubber material to afford even greater flexibility and adaptability of the mold body 9. Rigidity of the mold body is assured by a metal spine 51c set into the rubber material along the back of the center member. Guide elements 19a form the projecting portion of spine 51c while interfitting rubber strips 58 are an integral part of the rubber body 52c.

FIG. 11 shows the mold body members 56, 57, and 57', according to FIGS. 9a, 9b, and 9c, assembled into individual mold bodies 9a. The mold bodies 9a are in turn assembled into longitudinal grid elements 50a on longitudinal beams or guide rails 17a. The guide rails 17a are in turn mounted in parallel on cross beam 21a for assembling and compressing the longitudinal grid elements 50a into the three-dimensional grid structure 50.

FIG. 12 shows a substantially simplified apparatus 60 for laying fiber layers or strips onto a gluing mechanism 61 inserted into the apparatus 60 for producing a laminate planking 1a. A gantry type of crane 62 is movable back and forth in guide rails 62' of the apparatus base 66. A rotating drum type mechanism 63 is supported by the gantry crane 62 and carries a supply roller 64 of fiber reinforcing tape or strip material. A numerical control mechanism 65 is arranged in a conventional manner for the operation of the crane and the drum 63. The laminate planking 1a is made up of strips or tapes layed down onto the gluing apparatus 61 in a laminating type of operation, whereby the individual layers of the pre-impregnated fiber material are withdrawn from the supply rollers 64. By using a numerical control 65 for the control of the crane 62 and the drum 63, it is possible to substantially automate the laminating operation.

FIG. 13 illustrates an example embodiment of a fully automated manufacturing plant for producing surface type structural components. The plant comprises substantially a numerically controlled water jet cutting apparatus 71 for cutting the tapes 8 to suitable lengths and a controllable clamping or holding and driving as well as pressing down unit 41 cooperating with the automatic handler or robot 42 for winding the tapes 8 onto the mold body 9. The mold body 9 after having been wound with the tape 8 is placed by the robot 42 into a control box 72. Feed advance means not shown move the mold bodies 9 out of the control box 72 and onto the longitudinal carrier beams 17 to form longitudinal grid elements 50a. When all mold bodies 9 are assembled in rows on the carrier beams 17, pressure is applied in the direction of the arrows 73 on cross beam 21 to hold the assembly together and to form or complete the three-dimensional grid structure 50. Thereafter the grid structure 50 is tilted onto the laminate planking 1a which has meanwhile been prepared in the laying and gluing apparatus 61. The tilting is accomplished by lifting the arms 81 about the pivot means 82 when the gantry crane 52 is in a position at the end of the slide rails and out of the way.

Thereafter, the gluing apparatus 61 is moved into the autoclave 74 with the grid 50 and the laminate planking 1a thereon for curing the grid and planking.

All the just described manufacturing steps are controlled by the numerical control unit 70 in an automatic manner. The unit 70 as such is known in the art.

When the grid 50 with the laminate planking 1a thereon is heated in the autoclave 74, the expandable rubber of the components 52 of the mold bodies 9 expand to such an extent that the pressure required for the gluing and bonding of the wound box frames to each other is produced. The gluing and bonding takes place as the result of the curing of the synthetic resin by means of which the fiber reinforced tapes have been preimpregnated. Such adhesive bonding is well known in the art.

After the curing or hardening, the gluing apparatus 61 is placed into a support frame 75, for example, by means of a further robot 76 which also removes the mold bodies 9 from the grid structure in a direction away from the planking 1a. To the extent that the components 56, 57, and 57' of the mold bodies 9, 9a are soiled, they are cleaned in a cleaning system 78 to which they are transported by means of a conveyor rail 77. After the cleaned mold bodies leave the cleaning system 78, they are placed into a magazine 80 by a further robot 79. These mold body elements 56, 57, 57' may then be reused upon proper assembly, whereupon the robot 42 transports the mold bodies again to the tape winding unit 41.

Although the invention has been described with reference to specific example embodiments, it will be appreciated, that it is intended, to cover all modifications and equivalents within the scope of the appended claims.

What is claimed is:

1. An apparatus for producing a surface type structural component having a grid structure comprising: a plurality of mold bodies formed with guide elements, means for wrapping strips of impregnated fiber material around the periphery of said mold bodies to form multi-layed box frames mounted on said mold bodies, a plurality of longitudinal carrier beams formed with guide rails for receiving the mold bodies with guide elements for assembling the mold bodies and box frames mounted on said mold bodies into longitudinal grid elements, cross guide means arranged on said longitudinal carrier beams with a predetermined spacing between said cross guide means, a plurality of cross beams including cross guide rails for receiving said cross guide means and for assembling said longitudinal grid elements to form said grid structure, and a gluing means for applying a laminate sheathing to said assembled grid structure to form said surface type structural component.

2. The apparatus of claim 1, further comprising means for hardening and curing said surface type structural component under heat and pressure.

3. An automated manufacturing plant for producing surface type structural components comprising: a plurality of mold body work pieces formed with guide elements, first automated handling means comprising driving means for holding and rotating successive mold body work pieces, means for feeding and applying impregnated tapes to a work piece rotating on the driving means, and presser means operatively arranged for pressing the impregnated tapes against the mold body, said first automated handling means delivering molded work pieces comprising box frames mounted on said mold body work pieces for assembly into grid structures; longitudinal carrier beams having guide rail means complementary to the mold body work piece guide elements; second automated handling means for assembling and feeding molded work pieces on said longitudinal carrier beams in the longitudinal direction with guide elements engaging the guide rail means to form longitudinal grid elements; cross beam means and means slidably engaging the longitudinal carrier means on said cross beam means with the longitudinal grid elements in parallel relationship; means for compressing the longitudinal grid elements together to form a surface type reinforcing grid structure; sheath laying and gluing means comprising a bed, crane means movable across the bed, impregnated strip material supply means movable across said crane means, said bed, crane means, and supply means being arranged in operative relationship for laying out patterns of impregnated strip material from the supply roll onto the bed to form a laminate sheath of desired configuration; transfer means for transferring the reinforcing grid structure onto a laminate sheath formed on said bed of the sheath laying and gluing apparatus; autoclave means and second transfer means for transferring the sheath laying and gluing apparatus into said autoclave means for curing and hardening a grid and a laminate sheath combination; support frame means; and third automated handling means for transferring a cured grid and laminate sheath structure to the support frame and for removing the mold body work pieces from the grid structure.

4. The plant of claim 3, further comprising: transport and cleaning means for transporting and cleaning mold body work pieces removed from a grid structure by said third automated handling means, and magazine means for storing mold body work pieces received from the transport and cleaning means for reuse by the first automated handling means to form box frames for incorporation into another grid structure.

5. The plant of claim 3, wherein each of said mold body work pieces comprises a plurality of releasably interconnecting members including a center member comprising an elongate core of metal material and at least a layer of heat expandable rubber or elastic material.

6. The plant of claim 3, wherein said first automated handling means comprises first robot means having vacuum rail means secured to pivot arm means, whereby said robot means picks up specified lengths of impregnated tapes by said vacuum rail means and applies it to the periphery of a mold body work piece being held and rotated by said first automated handling means.

7. The plant of claim 3, further comprising central numerical control means for controlling an operation of said manufacturing plant in an automatic manner.

8. A method for the automated manufacturing of surface type structural components having a shape curved in space, comprising: assembling a plurality of mold body work pieces from releasably interconnecting members and forming at least one member of each of said mold body work pieces with a layer of elastic material which expands upon heating; holding and rotating successive mold body work pieces; feeding and applying tape of impregnated fiber material to each rotating mold body work piece to form molded work pieces forming box frames mounted on said mold body work pieces; pressing the tape against the mold body work piece; assembling a plurality of molded work pieces along longitudinal carriers and pressing said molded work pieces together to form a plurality of parallel longitudinal grid elements from said box frames; compressing the longitudinal grid elements together to form a grid structure of molded work pieces curved in space and comprising box frames still held on the mold body work pieces; laying and gluing strips of impregnated fiber material together forming a laminate sheathing of desired configuration; transferring the grid structure onto said laminate sheathing to form a respective combination; curing and hardening said grid structure and laminate sheathing combination simultaneously by heating said combination, thereby expanding the mold body work pieces and strongly bonding the elements of the grid structure and laminate sheathing combination together under pressure resulting from said expanding; transferring the cured and hardened grid structure and laminate sheathing combination; and removing the mold body work pieces from the cured grid structure and laminate sheathing combination by releasing and disassembling the interconnected members of each mold body work piece.

9. The method of claim 8, further comprising the steps of transporting and cleaning the mold body work pieces removed from the cured grid and laminate sheath structure and storing the mold body work pieces for reuse.

10. The apparatus of claim 1, wherein each of said mold bodies comprises a plurality of releasably interconnecting members including a center member comprising an elongate core of metal and at least a layer of heat expandable elastic material whereby said mold body expands during heating and curing of an assembled grid structure and whereby said mold body may be released and disconnected and removed after curing and hardening of the assembled grid structure.

11. The apparatus of claim 10, wherein said center member comprises predominantly heat expandable elastic material and wherein said elongate core of metal comprises a metal spine imbedded in the elastic material.

* * * * *